Patented Apr. 18, 1933

1,903,961

UNITED STATES PATENT OFFICE

CAMILLE DREYFUS, OF NEW YORK, N. Y., AND GEORGE SCHNEIDER, OF MONTCLAIR, NEW JERSEY, ASSIGNORS TO CELANESE CORPORATION OF AMERICA, A CORPORATION OF DELAWARE

METHOD OF REMOVING COMBINED SULPHUR FROM CELLULOSE ACETATE

No Drawing.   Application filed April 29, 1930. Serial No. 448,414.

This invention relates particularly to the purification of cellulose acetate.

An object of our invention is to treat cellulose acetate so that it is more stable and is more free from sulphur compounds than has heretofore been possible.

A further object of our invention is to treat cellulose acetate by subjecting the same to the action of an aqueous liquid, which is maintained at an elevated pressure and at a temperature preferably above the normal boiling point of water.

In the making of cellulose acetate, generally cellulose is treated with an acetylating agent such as acetic anhydride in the presence of sulphuric acid or other sulphur bearing compound as catalyst. During the acetylation there may also be present solvents such as acetic acid or diluents. The cellulose acetate thus formed may or may not be subjected to an after treatment known as "ripening" to develop the desired solubility characteristics, and is then precipitated and/or washed carefully. Despite the careful washing, the resultant cellulose acetate contains quite an appreciable amount of sulphur, probably in the form of a sulpho-cellulosic compound. For many purposes, the presence of the sulpho-compounds is objectionable, as it has the disadvantage, among others, of tending to render the cellulose acetate unstable even at ordinary temperatures, as for instance the cellulose acetate containing appreciable amounts of sulphur compounds tends to become brittle after a period of time and has other characteristics that are objectionable for some purposes.

We have found that if cellulose acetate formed in the presence of a sulphur bearing catalyst is subjected to boiling water or aqueous liquid at superatmospheric pressure and at a temperature above the normal boiling point of water (100° C.), for a suitable period of time, appreciable amounts and even all of the sulphur is removed therefrom without appreciably affecting the cellulose acetate. This result is surprising, since it would be predicted from a priori reasoning that the drastic treatment with water at elevated temperatures and pressures would tend to hydrolyze the cellulose acetate by splitting off acetyl groups rather than to attack the sulpho compounds.

In accordance with our invention we remove sulphur compounds from cellulose acetate which was formed in the presence of a sulphur bearing catalyst by subjecting the cellulose acetate in solid form to the action of water or aqueous liquid at temperatures preferably above the normal boiling point of water (100° C.) and at a superatmospheric pressure for a suitable period of time.

As stated the cellulose acetate to be treated may have previously been prepared by the action of acetic anhyride or other acetylating agent in the presence of a sulphur bearing catalyst such as sulphuric acid, sodium acid sulphate, dimethyl sulphate, etc. The acetylation may be conducted in any manner such as in the presence of acetic acid or other solvent from the cellulose acetate that is formed, or in the presence of a diluent wherein the cellulose acetate does not dissolve. The cellulose acetate may be subjected to a hydrolysis or ripening treatment to develop desired solubility characteristics, or the cellulose acetate may be precipitated directly from the acetylating bath without such ripening process. This invention is of general application to the treatment of cellulose acetate in solid form irrespective of how made or of its previous treatments, although generally it is preferable to wash the cellulose acetate with water to free it as much as possible from the reagents employed during the acetylation.

The cellulose acetate, in accordance with our invention, is treated with water or aqueous liquid preferably at temperatures above 100° C. In order to attain these temperatures, pressure is caused to develop in the heated vessel, which is closed and in which the treatment is taking place, and the temperature will depend upon such pressure, as is well understood. Generally superatmospheric pressures of 15 to 50 lbs. per square inch or more will be employed. The amount of water used is generally from 4 to 30 or more times the weight of the cellulose acetate being treated and the time of treatment may vary from 1 to 10 hours or more. Definite figures cannot be given, since there is an inter-relation between the pressure employed, the amount of water used and the time of treatment. The greater the amount of pressure used, the less amount of water and less time is required. Likewise for larger amounts of water less pressure and less time is required. We have found that the use of distilled water produces excellent results.

By way of illustration it is pointed out that if a cellulose acetate containing sulphur equivalent to 0.06% of sulphate ($SO_4$) based on the weight thereof is treated for 2 hours at a pressure of 25 lbs. per square inch above atmospheric pressure, if for each part by weight of cellulose acetate 6 parts of water are employed, the sulphur content is reduced to 0.021%; if 10 parts of water are used the sulphur is reduced to 0.016%; if 15 parts of water are used the sulphur is reduced to 0.012% and if 20 parts of water are used the sulphur is reduced to 0.008%. In these cases, of course, the temperature prevailing corresponds to the temperature at which water develops a vapor pressure corresponding to such pressures. Throughout the specification the percentages of sulphur are given as determined in the form of sulphate ($SO_4$), that is the percentages are by weight of $SO_4$ rather than of elementary sulphur.

Any suitable form of apparatus may be employed for carrying out this invention. Thus if a batch process is to be employed, the cellulose acetate and the water may be placed in an autoclave which is heated until the required pressure develops. For a continuous process, the mixture of the water and the cellulose acetate may be passed through heated passages, such as pipes, coils and the like that are maintained at the required pressure. This pressure may be maintained by a pressure release valve at the exit of the passage way, or the pipes or coils may be connected with stand pipes of sufficient height so as to develop a hydrostatic pressure corresponding to that required. The length of the passage and the rate of flow is regulated so that the cellulose acetate is subjected to the action of the water for the required period of time.

Cellulose acetate may be prepared in accordance with our invention which has a sulphur content equivalent to less than 0.03% of $SO_4$. We have prepared cellulose acetate which has substantially no sulphur, and some which have less than 0.02% and also less than 0.01%. The solubility characteristics of the cellulose acetate after being subjected to this process do not differ materially from those of the cellulose acetate prior to the process.

Because of the treatment described, cellulose acetate prepared by our invention has besides other advantages great stability as shown by the fact that it can be heated, without becoming discolored or decomposing, to a higher temperature than in the case of former cellulose acetate. The products so obtained are extremely valuable for making yarns or fabrics, varnishes, lacquers, films, celluloid-like articles, coatings, etc. Furthermore solutions of our cellulose acetate may be cast on nickel or other metallic surfaces for the making of films and the like, without the danger of corrosion of such surfaces. This is an important factor, since solutions of cellulose acetate of relatively high sulphur content tend to corrode nickel surfaces quite severely.

It is to be understood that the foregoing examples are given merely by way of illustration and that many variations may be made therein without departing from the spirit of our invention.

Having described our invention, what we desire to secure by Letters Patent is:

1. Method of removing combined sulphur from cellulose acetate comprising subjecting the solid cellulose acetate to an aqueous liquid under super-atmospheric pressures and at temperatures above 100° C.

2. Method of treating cellulose acetate formed in the presence of a sulphur containing catalyst comprising subjecting the cellulose acetate to the action of a relatively large amount of water at super-atmospheric pressure and at a temperature above 100° C.

3. Method of removing combined sulphur from cellulose acetate comprising continuously passing a mixture of cellulose acetate and water through a heated passage that is maintained at super-atmospheric pressure and continuously discharging the mixture from the passage.

4. Method of removing combined sulphur from cellulose acetate comprising heating the cellulose acetate and water until super-atmospheric pressure develops and maintaining such conditions until the cellulose acetate contains an amount of sulphur equivalent to less than 0.03% $SO_4$.

5. Method of removing combined sulphur from cellulose acetate comprising heating the cellulose acetate and water until super-atmospheric pressure develops and maintaining such conditions until the cellulose acetate contains an amount of sulphur equivalent to less than 0.02% $SO_4$.

6. Method of removing combined sulphur from cellulose acetate comprising heating the cellulose acetate and water until super-atmospheric pressure develops and maintaining such conditions until the cellulose acetate contains an amount of sulphur equivalent to less than 0.01% $SO_4$.

In testimony whereof, we have hereunto subscribed our names.

CAMILLE DREYFUS.
GEORGE SCHNEIDER.